Aug. 7, 1928.
O. M. OTTE
1,679,780
HAM BOILER
Filed April 1, 1925
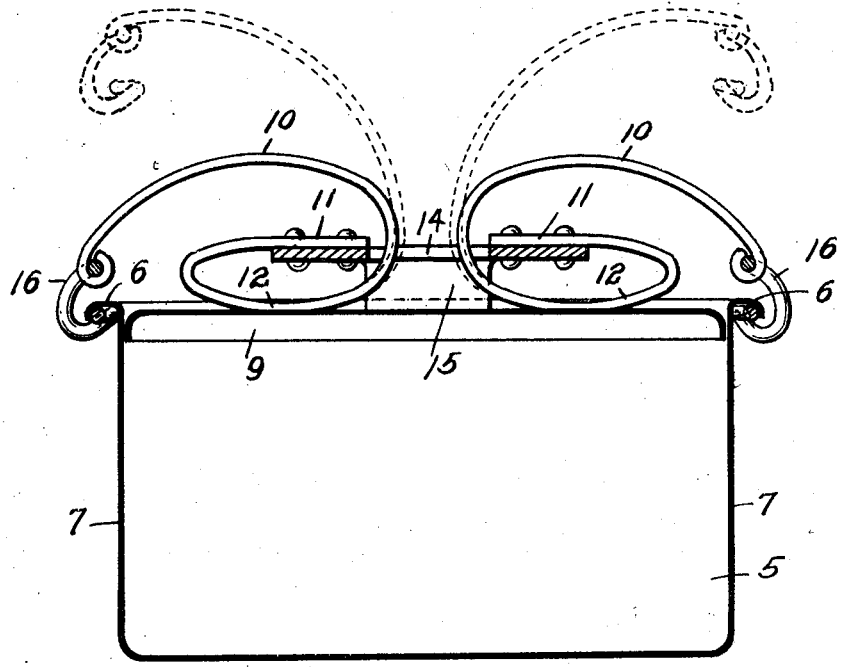
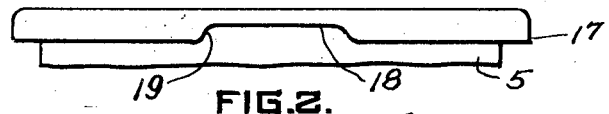
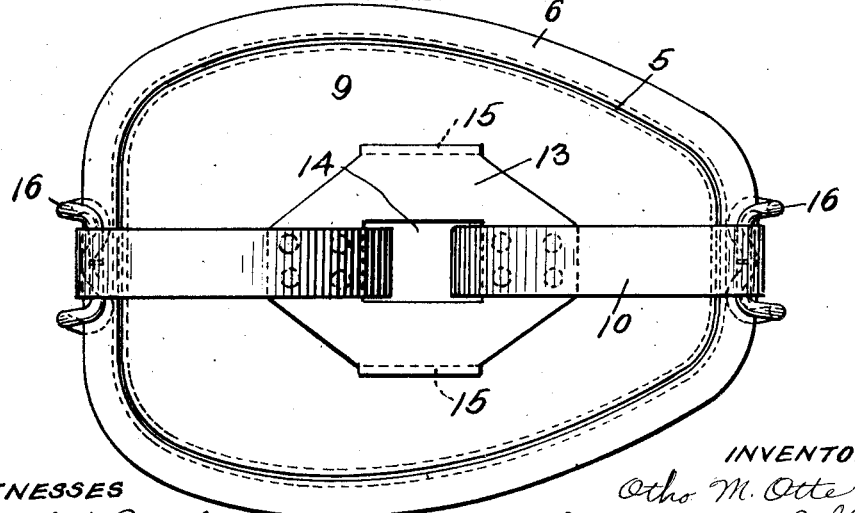

Patented Aug. 7, 1928.

1,679,780

UNITED STATES PATENT OFFICE.

OTHO M. OTTE, OF TARENTUM, PENNSYLVANIA, ASSIGNOR TO ALLEGHENY STEEL COMPANY, OF BRACKENRIDGE, PENNSYLVANIA, A CORPORATION OF PENNSYLVANIA.

HAM BOILER.

Application filed April 1, 1925. Serial No. 19,867.

This invention relates to cooking utensils and more particularly to ham boilers of the type used by meat packers in cooking and preparing meat for the market.

Boilers of the type set forth generally consist of a container for the meat having a lid which is telescopically received within the container, and a device is provided for applying a yielding pressure to the lid to press the same down upon the meat in the container so as to compact and mold the meat during cooking in order to impress the desired form upon the finished product.

An object of this invention is to provide a boiler of the type set forth having an improved device for pressing the lid firmly into contact with the contents of the boiler.

A further object is to provide a device of the type set forth which will be simple and cheap to manufacture easy to assemble and operate and rugged in construction.

These and other objects which will appear obvious to those skilled in this particular art are attained by means of this invention, one embodiment of which is shown for the purpose of illustration in the accompanying drawing, in which Figure 1 is a transverse sectional view through the center of a boiler provided with one form of this invention, Fig. 2 is a top plan view of the mechanism illustrated in Fig. 1, and Fig. 3 is a fragmentary view of an end of the container shown in Fig. 1.

The particular embodiment of this invention which has been chosen for the purposes of illustration includes a container 5 having the well-known, generally oval shape. The top edge of the container is bent so as to form a flange 6, and the usual lid 9 is telescopically received within the container.

During the process of cooking, and particularly when ham trimmings are being cooked it is necessary to force the lid 9 downwardly into contact with the contents of the container 6 with a strong but yielding pressure so that the contents will be molded to the desired form. To accomplish this I provide two springs 10 which are curved as shown in Fig. 1 so as to provide each spring with a substantially horizontal inner end 11 and an intermediate, lid bearing face 12. A connecting plate 13 is provided with a central slot 14 through which each spring extends, and the plate is riveted to the flat, inner ends 11 of each spring so as to connect them together and form an integral structure. The opposite edges of the plate are preferably provided with downwardly extending, lid engaging flanges 15 which engage the lid on opposite sides of the points of contact between the lid and the spring bearing faces 12 so that the lid will be forced down equally on all sides. This prevents the lid from tipping and binding in the container. Curved links 16 are pivotally mounted in the outer end of each spring 10 and are adapted to connect the outer end of each spring 10 with the adjacent portion of the flange 6 formed at the top of the container, so as to secure the springs in position to press the lid down firmly upon the contents of the container. The outer lip 17 of the flange 6 is preferably cut away as shown at 18, Fig. 3, so that the links 16 can be easily hooked under the flange. The edges 19 of the cut away portion also serve to prevent the links from sliding along the flange.

In operation when the container is filled the lid is placed thereon and the lid pressing device is positioned with the bearing faces 12 of each spring in contact with the lid. The springs 10 then assume the position shown in dotted lines in Fig. 1. Obviously when the links are connected to the flange 6 the lid 9 is forced downwardly with a yielding pressure so as to mold and shape the contents of the container during the process of cooking. The bearing faces 12 of the springs and the flanges 15 of the connecting plate form spaced points of engagement between the lid pressing device and the lid itself so that, as above pointed out, the latter is forced down equally at all points and is prevented from tipping and binding in the container.

The container, lid, springs and links are preferably made of a chromium iron alloy having a chromium content of between 9% and 21% and a carbon content under .14%. This, when the surface of the metal is treated with a solution of nitric acid, will make an article that is rustless and stainless.

What I claim as new and desire to secure by Letters Patent is:

1. A cooking utensil having in combination a container, a telescoping lid, a pair of springs adapted to press upon said lid, a connecting plate for securing the adjacent ends of said springs together, means for attaching the outer ends of said springs to said container so as to cause said lid to compress the contents thereof and means on said plate for balancing said lid.

2. A cooking utensil having in combination a container, a telescoping lid, a pair of springs provided with lid bearing faces between the ends thereof, a plate for connecting the adjacent ends of said springs together, said plate having lid engaging flanges formed thereon and means for attaching the outer ends of said springs to said container so as to press said lid into contact with the contents of said container.

3. A cooking utensil having in combination a container, a telescoping lid, a lid pressing device including a pair of springs adapted to be connected to said container so as to press said lid into contact with the contents of said container and means provided with downwardly extending lid engaging flanges for preventing tipping of said lid.

In testimony whereof, I have hereunto subscribed my name this 30th day of March, 1925.

OTHO M. OTTE.